US006826777B1

(12) United States Patent
Owens, Jr. et al.

(10) Patent No.: US 6,826,777 B1
(45) Date of Patent: Nov. 30, 2004

(54) RACK MOUNTED DIGITAL VIDEO

(75) Inventors: Benal Lee Owens, Jr., Apex, NC (US); Matthew S. Michaels, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 09/632,487

(22) Filed: Aug. 4, 2000

(51) Int. Cl.[7] .................................................. H04N 7/18
(52) U.S. Cl. .............................. 725/91; 725/74; 710/1
(58) Field of Search .............................. 725/91, 93, 114, 725/116, 117, 147, 146, 144, 82, 138; 710/1; 307/36

(56) References Cited

U.S. PATENT DOCUMENTS

| | | | | |
|---|---|---|---|---|
| 5,038,317 A | * | 8/1991 | Callan et al. | 710/301 |
| 5,317,477 A | | 5/1994 | Gillett | 361/683 |
| 5,388,032 A | | 2/1995 | Gill et al. | 700/17 |
| 5,577,205 A | | 11/1996 | Hwang et al. | 361/683 |
| 5,675,390 A | * | 10/1997 | Schindler et al. | 345/717 |
| 5,675,811 A | | 10/1997 | Broedner et al. | 713/323 |
| 5,802,391 A | | 9/1998 | Hwang | 710/2 |
| 5,822,184 A | | 10/1998 | Rabinovitz | 361/685 |
| 5,835,498 A | | 11/1998 | Kim et al. | 370/537 |
| 5,913,034 A | * | 6/1999 | Malcolm | 709/223 |
| 6,144,796 A | * | 11/2000 | Teece et al. | 386/46 |
| 6,169,879 B1 | * | 1/2001 | Perlman | 725/119 |
| 6,388,658 B1 | * | 5/2002 | Ahern et al. | 345/168 |
| 6,411,506 B1 | * | 6/2002 | Hipp et al. | 361/686 |
| 6,609,034 B1 | * | 8/2003 | Behrens et al. | 700/19 |
| 6,633,905 B1 | * | 10/2003 | Anderson et al. | 709/219 |
| 6,658,504 B1 | * | 12/2003 | Lieber et al. | 710/52 |
| 2003/0088655 A1 | * | 5/2003 | Leigh et al. | 709/223 |

OTHER PUBLICATIONS

Stromski, James R., "Buyer's Guide: Make Room for KVM", Network Computing, Sep. 1999, p. 108.*
"Supervisor Phantom: Revised Preliminary User's Guide", Minicom Advanced Systems, Apr. 1999.*
IBM Technical Disclosure Bulletin, Accessible interconnect for rack–mounted processor module–to–module logic signal communication, Sep. 1989, vol. 32, No. 4B, pp. 276–277.

* cited by examiner

*Primary Examiner*—John Miller
*Assistant Examiner*—Scott Beliveau
(74) *Attorney, Agent, or Firm*—Sawyer Law Group LLP

(57) ABSTRACT

The present invention provides a method and system for providing a rack mounted computer system which transmits a digital video signal through multiple computers. The computer system includes a plurality of computers and a plurality of cables connecting the plurality of computers in a serial manner, where the plurality of cables transmits a digital video signal from one of the plurality of computers. By transmitting the video signals in a digital format, signal degradation is decreased, providing a clearer video signal at the display. Multiplexers internal to each computer are provided, allowing a more cost effective use of space than conventional rack mounted systems where external multiplexers are required. The preferred embodiment utilizes a cabling scheme where the computers are connected in a serial manner. By connecting the computers serially, short cable hops between the computers may be used, decreasing the cost in cable length. Such short cable hops are also physically easier to wire. Thus, the total cost of the system decreases.

23 Claims, 3 Drawing Sheets

RACK MOUNTED DIGITAL VIDEO

FIELD OF THE INVENTION

The present invention relates to the monitoring of computer systems, and more particularly to the monitoring of rack mounted computer systems.

BACKGROUND OF THE INVENTION

FIG. 1 illustrates a conventional rack mounted computer system. The system comprises a container or rack 102 within which are mounted a plurality of computers 104.1–104.$n$. The video outputs of each of the computers 104.1–104.$n$ are connected to an analog video multiplexer (MUX) 106 through cables 108.1–108.$n$. Thus, the conventional rack mounted computer system uses a parallel cabling scheme. The analog video MUX 106 is capable of receiving an analog video signal from one of the computers 104.1–104.$n$ and displaying it onto a console 110 with a display device. Each computer 104.1–104.$n$ must also have cables (not shown) running from outputs to a break-out box (not shown), the break-out box then connected to a keyboard and a mouse.

However, the analog video signals experience signal degradation as they are transmitted to the MUX 106, compromising the video quality at the console 110. Also, due to the analog nature of the video monitoring system, only a limited number of computers may be connected to a MUX. Thus, for large computer systems, such as those comprising thirty or forty computers, multiple MUX's in multiple layers are required. This results in even greater signal degradation. With the parallel cabling scheme, these large computer systems are burdened with a heavy wiring mass.

Accordingly, there exists a need for improved video for a rack mounted computer system. This system should minimize signal degradation, decrease the amount of cables required, and reduce the total cost of the system. The present invention addresses such a need.

SUMMARY OF THE INVENTION

A method and system for providing a rack mounted computer system which transmits a digital video signal through multiple computers includes a plurality of computers and a plurality of cables connecting the plurality of computers in a serial manner, where the plurality of cables transmits a digital video signal from one of the plurality of computers. Each computer includes a planar video controller and a receiver. The computer selected for display at the console provides parallel data streams with it planar video controller. The computers not selected for display at the console receive the serial data stream from an upstream computer and converts it into the parallel data streams. The parallel data streams are multiplexed and converted in a serial data stream and transmitted to downstream computers. Eventually, the data stream from the selected computer is displayed at the console. By transmitting the video signals in a digital format, signal degradation is decreased, providing a clearer video signal at the display. By connecting the computers serially, short cable hops between the computers may be used, decreasing the cost in cable length. Such short cable hops are also physically easier to wire. Thus, the total cost of the system decreases.

DETAILED DESCRIPTION

The present invention provides improved video for a rack mounted computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The rack mounted computer system in accordance with the present invention transmits a digital video signal through multiple computers to a display device. By transmitting the video signal in a digital format, signal degradation is decreased, providing a clearer video signal at the display. Multiplexers internal to each computer are provided, allowing a more cost effective use of space than conventional rack mounted systems where external multiplexers are required. The preferred embodiment utilizes a cabling scheme where the computers are connected in a serial manner. By connecting the computers serially, short cable hops between the computers may be used, decreasing the cost in cable length. Such short cable hops are also physically easier to wire. Thus, the total cost of the system decreases.

To more particularly describe the features of the present invention, please refer to FIGS. 2 and 3 in conjunction with the discussion below.

Figure 1:
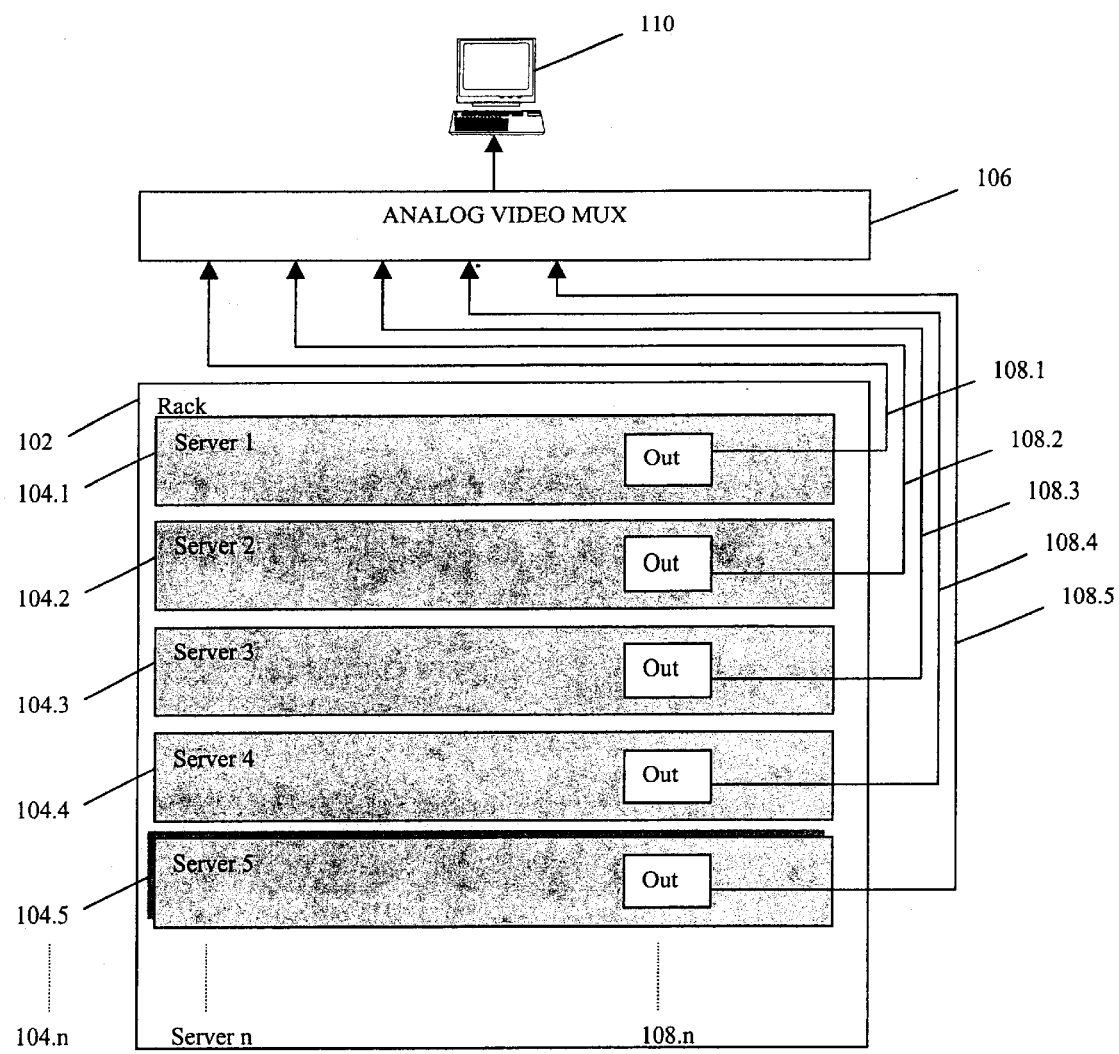
FIG. 1 illustrates a conventional rack mounted computer system.
Figure 2:
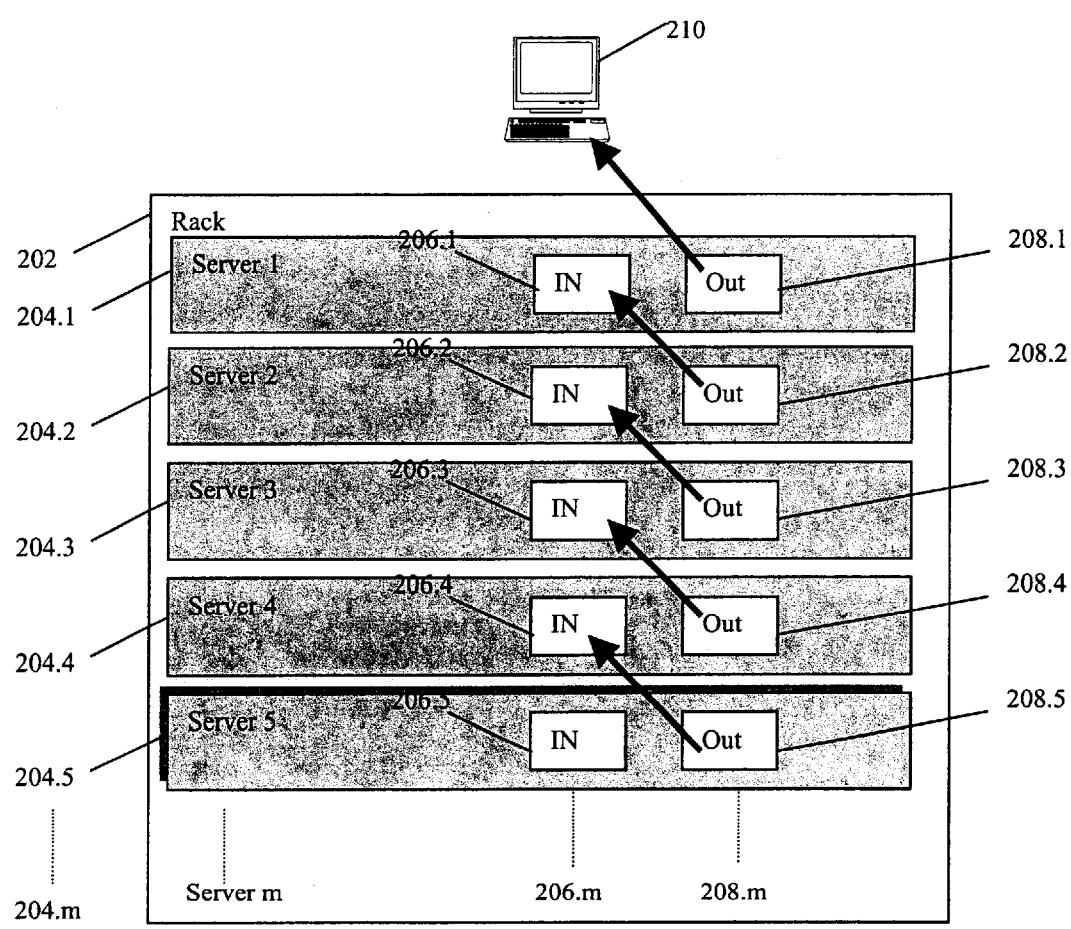
FIG. 2 illustrates a preferred embodiment of a rack mounted computer system provided in accordance with the present invention.

FIG. 2 illustrates a preferred embodiment of a rack mounted computer system provided in accordance with the present invention. The system comprises a rack 202 with a plurality of computers 204.1–204.$m$. Each computer 204.1–204.$m$ has an input port 206.1–206.$m$ and an output port 208.1–208.$m$ for the video signal. Thus, the computers 204.1–204.$m$ are connected with a serial cabling scheme. For example, the output port 208.5 of computer 204.5 is connected to the input port 206.4 of an upstream computer 204.4. The output port 208.4 of the upstream computer 204.4 is connected to the input port 206.3 of a computer 204.3 upstream from it, etc. The output port 208.1 of the last computer 204.1 is connected to the console 210. A video signal from one of the computers 204.1–204.$m$ is transmitted upstream in a digital format through the computers, to the console 210 for display. Although the console 210 is illustrated as being attached to computer 204.1, it may be attached to any of the other computers 204.2–204.$m$. In this specification, the computer with the console 210 functions as the "master" computer, such as maintaining the configuration of the computers 204.1–204.$m$ and other system management functions. The remaining computers are "slave" computers.

Figure 3:
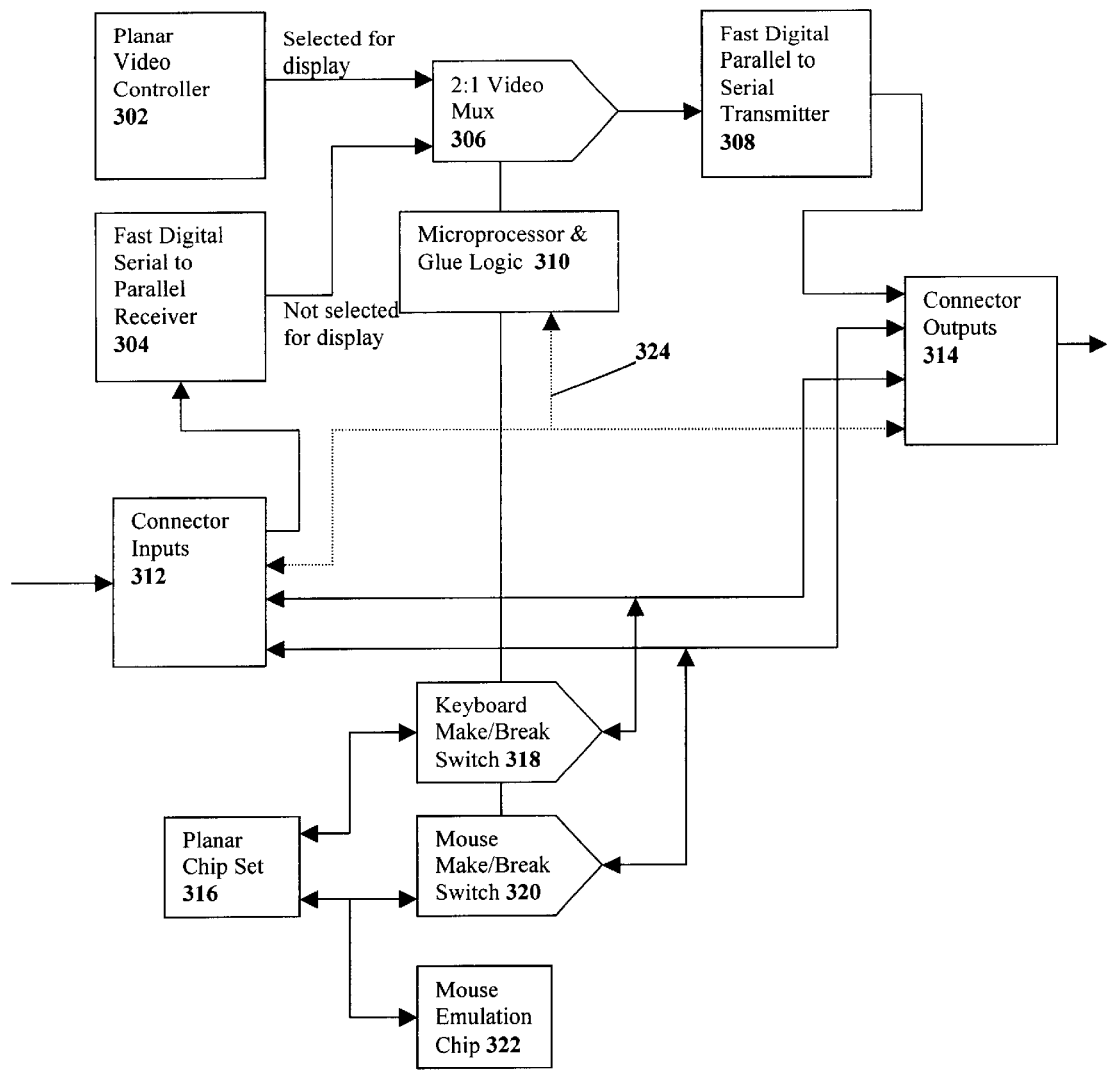
FIG. 3 illustrates a preferred embodiment of a logic in each computer of the rack mount computer system in accordance with the present invention.

FIG. 3 illustrates a preferred embodiment of a logic in each computer of the rack mount computer system in accordance with the present invention. In the preferred embodiment, the same logic is in each computer 204.1–204.$m$ in the rack 202 to facilitate ease of implementation. For example, assume that the logic resides in computer 204.4. The logic comprises a planar video controller 302 which is capable of providing digital video data for the computer 204.4. If the computer 204.4 is selected for display at the console 210, then the planar video controller 302 provides the computer's 204.4 digital video data in parallel data streams to the video multiplexer (MUX) 306, which drives the data signals. The data includes digital RGB (red, green, blue) data signals, synchronization signals, and a pixel clock signal, as is well known in the art. The MUX 306 is preferably a 2:1 MUX, however, other ratios may be used without departing from the spirit and scope of the present invention. The parallel data streams are then converted to a serial data stream by the fast digital parallel to serial transmitter 308. This digital serial data stream is then transmitted to the output port 208.4 via the connector outputs 314.

If the computer 204.4 is not selected for display, then it receives the serial digital video data stream through its input port 206.4. This serial data stream is transmitted to the fast digital serial to parallel receiver 304 via the connector inputs 312. The receiver 304 converts the serial digital video signal to parallel data streams and forwards the data streams to the MUX 306. The MUX 306 redrives the parallel data streams and forward it to the transmitter 308, which converts the parallel data streams to a serial data stream. The serial digital data stream is then transmitted to the output port 208.4 via the connector outputs 314.

By transmitting the digital video signal between computers 204.1–204.m as a serial data stream, fewer signal lines, and thus fewer wires in the cables, are needed. However, digital video data may be transmitted between multiple computers as parallel data streams with the use of a more complicated MUX circuitry, without departing from the spirit and scope of the present invention.

A microprocessor 310 controls the functioning of the logic. The microprocessor 310 maintains whether or not the computer 204.4 is selected for display at the console 210 and whether or not the computer 204.4 is the master. If the computer 204.4 is the master, then the microprocessor 310 can send commands to the slaves through a bus 324. Preferably, the bus 34 is a I²C-type bus, which is well known in the art. The microprocessor 310 includes glue logic for connecting a service processor (not shown) for remote control of the computer 204.4. The microprocessor 310 also controls the direction of the MUX 306 and has some diagnostic ability.

In the preferred embodiment, one of the computers 204.1–204.m may be selected for display at the console 210 in three ways. First, there could be a mechanical switch at each computer 204.1–204.m. By positioning the switch of one of the computers 204.1–204.m, that computer is selected. Second, a user at the console 210 can select one of the computers 204.1–204.m through a keyboard and/or a mouse. Third, the microprocessor 310 at the master can send a command stream via the bus 324 to set the register bits of the slaves such that a particular computer is selected.

The preferred embodiment of the logic has the added feature of using the same keyboard and mouse for all of the computers 204.1–204.m in the rack 202. However, in some conventional I/O subsystems, the keyboard and mouse must be physically attached to the computer for the computer to recognize the existence of these devices. To avoid having to physically attach and detach these devices, a keyboard make/break switch 318, a mouse make/break switch 320, and a mouse emulation chip 322 are provided in the logic. The I/O subsystem of the computer is provided by the planar chip set 316. The switches 318, 320 and the mouse emulation chip 322 are added to the I/O subsystem.

If a computer, such as computer 204.1, is the master, then the keyboard make/break switch 318 connects the keyboard to the computer 204.1, as if the keyboard is physically attached to the computer 204.1. If the computer 204.1 is not the master, then the keyboard make/break switch 318 disconnects the keyboard. If the computer 204.1 is the master, then the mouse make/break switch 320 connects the mouse to the computer 204.1, as if the mouse is physically attached to the computer 204.1. If the computer 204.1 is not the master, then the mouse make/break switch 320 disconnects the mouse. The mouse emulation chip 322 mimics a physical connection for the mouse so that the planar I/O subsystem can successfully complete the BIOS and operating system mouse testing without error. Such mouse testing is well known in the art and will not be described here.

The digital video signal is eventually transmitted to the master computer 204.1, which sends the signal to the console 210. A break-out box (not shown) with signal format conversion logic may be added between the output port 208.1 of the master 204.1 and the console 210 to allow either a digital or analog video signal to be sent to the console 210. This allows flexibility in the type of display device which may be used at the console 210. Additional buses for other functions may also be connected to the computer system by wiring the bus into the cable between the computers 204.1–204.m and between the computer 204.1 and the console 210.

A rack mounted computer system which transmits a digital video signal through multiple computers has been disclosed. By transmitting the video signals in a digital format, signal degradation is decreased, providing a clearer video signal at the display. Multiplexers internal to each computer are provided, allowing a more cost effective use of space than conventional rack mounted systems where external multiplexers are required. The preferred embodiment utilizes a cabling scheme where the computers are connected in a serial manner. By connecting the computers serially, short cable hops between the computers may be used, decreasing the cost in cable length. Such short cable hops are also physically easier to wire. Thus, the total cost of the system decreases.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing video in a computer system, comprising the steps of:
   (a) providing digital video data in a plurality of parallel data streams from a computer of a plurality of computers, if the computer is selected to be displayed at a console, wherein the plurality of computers is coupled in a serial manner to a console;
   (b) receiving a serial data stream from an upstream computer and converting the serial data stream into the plurality of parallel data streams, if the computer is not selected to be displayed at the console;
   (c) multiplexing the plurality of parallel data streams;
   (d) converting the multiplexed plurality of parallel data streams into a the serial data stream:
   (e) transmitting the serial data stream from the computer through each of the plurality of computers downstream from the computer; and (f) transmitting the serial data stream to be displayed at the console.

2. A method for providing video in a computer system, comprising the steps of:

(a) providing a console;

(b) providing a digital video signal from a computer of a plurality of computers, wherein the plurality of computers are connected in a serial manner to the console, wherein the providing comprises:

(a1) providing a plurality of parallel data streams, if the computer is selected for display at the console;

(a2) receiving a serial data stream from an upstream computer and converting the serial data stream to into the plurality data streams, if the computer is not selected for display at the console, (a3) multiplexing the plurality of parallel data streams;

(a4) converting the multiplexed plurality of parallel data streams into the serial data stream; and (a5) outputting the serial data stream from the computer; and (b) transmitting the digital video signal in the serial data stream from the computer through downstream computers to be displayed at the console.

3. The method of claim 2 further comprising:

(c) selecting the computer to provide the digital video signal.

4. The method of claim 3 wherein the selecting step (c) comprises:

(c1) positioning a switch on the computer.

5. The method of claim 3, wherein the selecting step (c) comprises:

(c1) selecting the computer by a user at a console connected to a master computer of the plurality of computers.

6. The method of claim 3, wherein the selecting step (c) comprises:

(c1) sending a command stream by a microprocessor of a master computer of the plurality of computers to set a register bit of the computer.

7. The method of claim 2, further comprising:

(c) selecting the computer as a master computer.

8. The method of claim 7, wherein the selecting step (c) comprises:

(c1) determining that the console is connected to the computer; and (c2) setting a register bit in the computer indicating that the computer is the master computer.

9. The method of claim 2, further comprising:

(c) determining if the computer is the master computer;

(d) positioning a keyboard make/break switch to provide a physical connection between a keyboard and the computer, if the computer is the master computer; and (e) positioning a mouse make/break switch to provide a physical connection between a mouse and the computer, if the computer is the master computer.

10. A computer system, comprising:

an console;

a plurality of computers, wherein each computer comprises:

a planar video controller for providing a plurality of parallel data streams, if the computer is selected for display at the console, a receiver for receiving a serial data stream from an upstream computer and converting the serial data stream into the plurality data stream, if the computer is not selected for display at the console, a multiplexer, for multiplexing the plurality of parallel data streams, and a transmitter for converting the multiplexed plurality of parallel data streams to the serial data stream; and a plurality of cables connecting the plurality of computers to the console in a serial manner, wherein the plurality of cables transmits a digital video signal comprising the serial data stream from one of the plurality of computers through downstream computers to be displayed at the console.

11. The system of claim 1, wherein each of the plurality of computer comprises:

an input video port capable of being connected to an output port of a downstream computer; and an output video port capable of being connected to an input port of an upstream computer.

12. The system of claim 1, wherein one of the plurality of computers comprises an output port connected to a the console.

13. The system of claim 1, wherein the multiplexer is a two-to-one multiplexer.

14. The system of claim 1, wherein the microprocessor comprises a glue logic for connecting a service processor.

15. The system of claim 1, further comprising:

a connector input coupled to the receiver; and a connector output coupled to the transmitter.

16. The system of claim 15, further comprising:

a bus couple to the connector input, the connector output, and the microprocessor.

17. The system of claim 1, further comprising:

a planar chip set;

a keyboard make/break switch coupled to the planar chip set;

a mouse make/break switch coupled to the planar chip set; and a mouse emulation chip coupled to the planar chip set.

18. The system of claim 1, further comprising:

a rack, wherein the plurality of computers are mounted within the rack.

19. The system of claim 1, further comprising:

a display device; and a cable coupled to the display device and the plurality of computers.

20. The system of claim 19, further comprising:

a converter coupled to the cable and the display device, wherein the converter converts the digital video signal to a format recognizable by the display.

21. The system of claim 19, further comprising:

a bus coupled to the cable.

22. A computer system, comprising:

a console;

a plurality of computers, wherein each of the plurality of computers comprises:

an input video port capable of being connected to an output port of a downstream computer, an output video port capable of being connected to an input port of an upstream computer, and a logic, the logic comprising:

a planar video controller for providing a plurality of parallel data streams, if the computer is selected for display at the console, a receiver coupled to the input video port for receiving a serial data stream from an upstream computer and converting the serial data stream into the plurality of parallel data streams, if the computer is not selected for display at the console, a multiplexer coupled to the planar video controller and the receiver for multiplexing the parallel data streams, a transmitter coupled to the multiplexer and the output video port for converting the multiplexed parallel dots streams to the serial data stream, and a microprocessor coupled to the multiplexer; and a plurality of cables connecting the plurality of computers to the console in a serial manner, wherein the plurality of cables transmits a digital video signal comprising the serial data stream from one of the plurality of computers through downstream computers to be displayed at the console.

23. A computer system, comprising:

means for providing a digital video signal in a plurality of parallel data streams from a computer of a plurality of computers, if the computer is selected to be displayed at a console, wherein the plurality of computers are connected in a serial manner to the console;

means for receiving a serial data stream from an upstream computer and converting the serial data stream into the plurality of data streams, if the computer is not selected to be displayed at the console;

means for multiplexing the plurality of parallel data streams;

means for converting the multiplexed plurality of parallel data streams into the serial data stream;

means for transmitting the digital video signal in the serial data stream from the computer through downstream computers; and means for transmitting the serial data stream to be displayed at the console.

* * * * *